(12) United States Patent
Park et al.

(10) Patent No.: US 12,302,052 B2
(45) Date of Patent: May 13, 2025

(54) ELECTRONIC DEVICE COMPRISING ACOUSTIC DIMPLE

(71) Applicant: SAMSUNG ELECTRONICS CO., LTD., Suwon-si (KR)

(72) Inventors: Yongwook Park, Suwon-si (KR); Yongbum Jeung, Suwon-si (KR); Seeyoun Kwon, Suwon-si (KR); Sangwoo Yu, Suwon-si (KR); Seunga Lee, Suwon-si (KR); Jeock Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 18/075,747

(22) Filed: Dec. 6, 2022

(65) Prior Publication Data

US 2023/0095154 A1 Mar. 30, 2023

Related U.S. Application Data

(63) Continuation of application No. PCT/KR2021/002821, filed on Mar. 8, 2021.

(30) Foreign Application Priority Data

Jul. 20, 2020 (KR) .................... 10-2020-0089896

(51) Int. Cl.
*H04R 1/10* (2006.01)
*H04R 1/08* (2006.01)
*H04R 1/28* (2006.01)

(52) U.S. Cl.
CPC ........... *H04R 1/1016* (2013.01); *H04R 1/083* (2013.01); *H04R 1/28* (2013.01); *H04R 2201/107* (2013.01); *H04R 2460/11* (2013.01)

(58) Field of Classification Search
CPC ....... H04S 7/302; H04R 19/04; H04R 1/1041; H04R 1/1016; H04R 1/083; H04R 1/28;
(Continued)

(56) References Cited

U.S. PATENT DOCUMENTS 11,689,841 B2* 6/2023 Zyskind .................. H04S 7/302
381/74
2009/0190769 A1* 7/2009 Wang ....................... H03G 3/32
381/66

(Continued)

FOREIGN PATENT DOCUMENTS

KR 20-2013-0004892 U 8/2013
KR 10-2017-0123818 A 11/2017
(Continued)

OTHER PUBLICATIONS

Surur, New 3D animation of the Samsung Galaxy Buds Live leaked, confirms dual speakers, Jul. 17, 2020, pp. 1-5 (NPL Dec. 6, 2022) (Year: 2020).*

(Continued)

*Primary Examiner* — Angelica M McKinney
(74) *Attorney, Agent, or Firm* — Sughrue Mion, PLLC

(57) ABSTRACT

An electronic device wearable on a body may include: a first case configured to at least partially contact the body when the electronic device is worn on the body; a second case coupled to the first case, the second case being configured to, at an exposed area on an outer surface of the second case, be exposed when the electronic device is worn on the body; a first acoustic hole configured to penetrate the second case in the exposed area; a second acoustic hole configured to penetrate the second case at a position different from the first acoustic hole; and an acoustic dimple recessed into the outer surface of the second case and extending from the second acoustic hole.

19 Claims, 9 Drawing Sheets

(58) Field of Classification Search
CPC .......... H04R 2201/107; H04R 2460/11; H04R 1/1083; H04R 1/406; H04R 3/005; H04R 2460/01; H04R 1/1075; H04R 2499/11; H05K 7/1427; H03G 3/32; G06F 1/1684; G06F 1/1688; G06F 1/1698; G06F 1/163; G06F 1/1628

See application file for complete search history.

(56) References Cited

U.S. PATENT DOCUMENTS

| | | | |
|---|---|---|---|
| 2016/0050474 A1* | 2/2016 | Rye ...................... | H05K 7/1427 381/152 |
| 2017/0093079 A1 | 3/2017 | Wagman et al. | |
| 2017/0094392 A1 | 3/2017 | Zorkendorfer et al. | |
| 2017/0195791 A1 | 7/2017 | Pedersen | |
| 2017/0318401 A1 | 11/2017 | Chang et al. | |
| 2019/0058937 A1 | 2/2019 | Saulsbury et al. | |
| 2019/0327550 A1 | 10/2019 | Lindén et al. | |
| 2020/0120411 A1 | 4/2020 | Yu et al. | |
| 2020/0186907 A1 | 6/2020 | Kim et al. | |
| 2020/0374621 A1 | 11/2020 | Huang | |
| 2021/0014598 A1* | 1/2021 | Pine ...................... | H04R 1/1041 |
| 2021/0099786 A1 | 4/2021 | Sasaki | |
| 2021/0250676 A1 | 8/2021 | Kim et al. | |
| 2023/0156386 A1* | 5/2023 | Du ........................ | H04R 19/04 257/416 |

FOREIGN PATENT DOCUMENTS

| | | |
|---|---|---|
| KR | 10-2059001 B1 | 12/2019 |
| KR | 10-2020-0011607 A | 2/2020 |
| KR | 10-2020-0019660 A | 2/2020 |
| KR | 10-2020-0069650 A | 6/2020 |
| KR | 10-2021-0101597 A | 8/2021 |

OTHER PUBLICATIONS

"New 3D animation of the Samsung Galaxy Buds Live leaked, confirms dual speakers—MSPoweruser", 2020, 5 pages total, https://mspoweruser.com/new-3d-animation-of-the-samsung-galaxy-buds-live-leaked.

"Walkingcat, Galaxy Beans", 2020, 2 pages total, twitter.com/h0x0d/status/1284172681185656838.

Search Report (PCT/ISA/210) issued Jun. 11, 2021 by the International Searching Authority for International Patent Application No. PCT/KR2021/002821.

Written Opinion (PCT/ISA/237) issued Jun. 11, 2021 by the International Searching Authority for International Patent Application No. PCT/KR2021/002821.

Communication issued Sep. 18, 2023 by the European Patent Office in European Patent Application No. 21845648.1.

Communication dated Nov. 13, 2024, issued by the Korean Intellectual Property Office in Korean Patent Application No. 10-2020-0089896.

* cited by examiner

ELECTRONIC DEVICE COMPRISING ACOUSTIC DIMPLE

CROSS-REFERENCE TO RELATED APPLICATIONS

This application is a continuation application of International Application No. PCT/KR2021/002821, filed on Mar. 8, 2021, which claims priority to Korean Patent Application No. 10-2020-0089896 filed on Jul. 20, 2020 in the Korean Intellectual Property Office, the disclosures of which are herein incorporated by reference.

TECHNICAL FIELD

Various embodiments of the disclosure relate to an electronic device wearable on a body, for example, an electronic device including an acoustic dimple.

BACKGROUND

With the development of electronic, information, and communication technologies, various functions have been integrated into a single electronic device. For example, an electronic device (e.g., a smart phone) includes a variety of different functionalities such as operating as an audio player, an imaging device, an electronic notebook, as well as an electronic communication device. A variety of additional functions may be implemented in the electronic device (e.g., smart phone) by installing additional applications. The electronic device may receive various types of information in real time by not only executing a loaded application or a stored function, but also accessing a server or other electronic device via wired or wireless communication.

As electronic devices become more common in daily use, user demands for portability and usability of the electronic devices may increase. In response to such user demands, an electronic device that may be carried and used while worn on the body (hereinafter, a 'wearable electronic device') like a wrist watch or glasses has been commercialized and made available to consumers. Even prior to such wrist watch-type or glasses-type electronic devices, electronic devices having additional functionalities, such as earphones or a hands-free set, provided an environment in which other electronic devices (e.g., smart phones) may be used more conveniently. Short-range wireless communication (e.g., Bluetooth) allows for an electronic device (e.g., earphones or a hands-free set) to transmit/receive a sound signal through wireless communication with another electronic device, while being worn on a user's body (e.g., ears).

SUMMARY

An electronic device worn on a user's ears may include a wearing member or a microphone unit. The wearing member (e.g., a frame or a hook) may be configured to wrap around the user's ear to prevent the electronic device from being separated from the ear, and the microphone unit may provide an environment in which a sound may be received near the user's mouth. An electronic device (e.g., earphones or a hands-free set) may be wearable on an ear, while being configured to transmit sound into the auditory canal and may be supported by structures of the external ear such as the tragus, antitragus, and/or antihelix.

Various embodiments of the disclosure may provide an electronic device which is wearable using a space substantially surrounded by a user's ear and capable of receiving a sound using a plurality of microphones.

Various embodiments of the disclosure may provide an electronic device capable of improving the quality of a received sound or an output sound based on a sound received using a plurality of microphones.

According to various embodiments of the disclosure, an electronic device may include a first case configured to at least partially contact a user's body when the electronic device is worn on the body, a second case coupled to the first case, the second case being configured to, at an exposed area on an outer surface of the second case, be exposed when the electronic device is worn on the body, a first acoustic hole configured to penetrate the second case in the exposed area, a second acoustic hole configured to penetrate the second case at a position different from the first acoustic hole, and an acoustic dimple recessed into an outer surface of the second case and extending from the second acoustic hole.

According to various embodiments of the disclosure, the electronic device may further include a first microphone disposed inside the second case in correspondence with the first acoustic hole, a second microphone disposed inside the second case in correspondence with the second acoustic hole, and a processor. The acoustic dimple may be located at least partially within the exposed area. The processor may be configured to receive a sound signal using at least one of the first microphone or the second microphone.

The electronic device may be configured to receive sounds through a plurality of paths and/or a plurality of microphones, while being worn in a space substantially surrounded by a user's ear. For example, the electronic device may perform acoustic beamforming, active noise canceling (ANC), echo canceling (EC), noise suppression (NS), and/or feedforward (FF) based on the sounds received through the plurality of paths and/or the plurality of microphones, thereby improving the quality of the obtained sounds such as the user's voice. In some embodiments, when outputting a sound, the electronic device may perform the ANC function and/or the NS function to improve the quality of the output sound.

DETAILED DESCRIPTION OF THE DISCLOSURE

Figure 1:
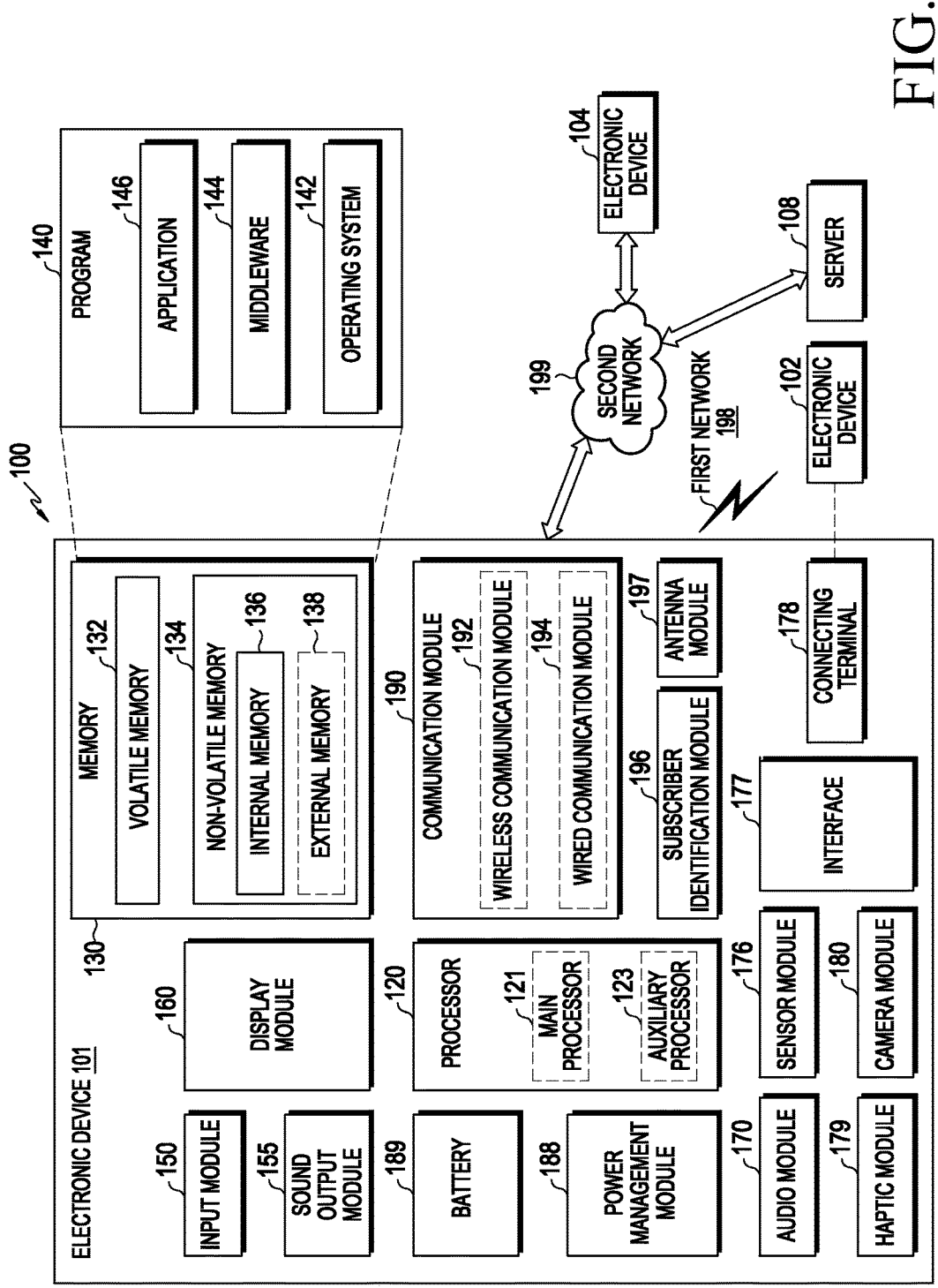
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
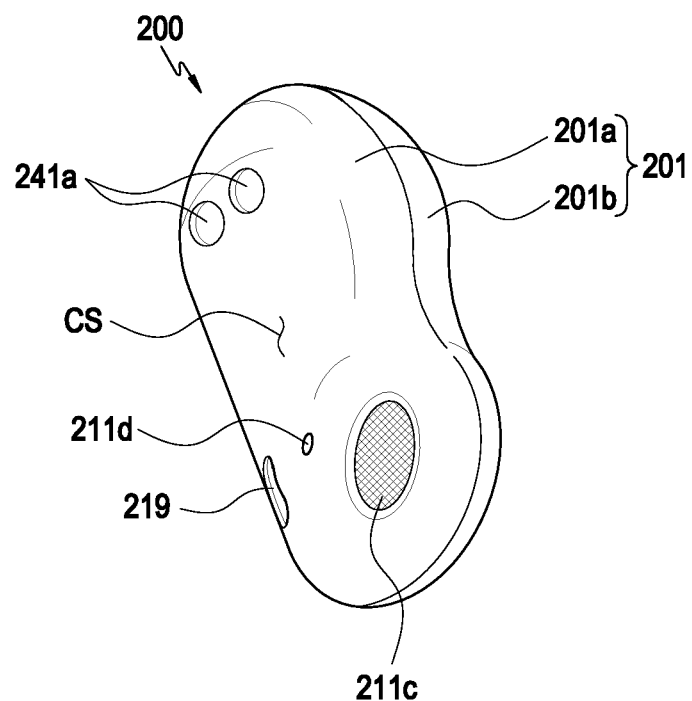
FIG. 2 is a perspective view illustrating an electronic device according to various embodiments of the disclosure.
Figure 3:
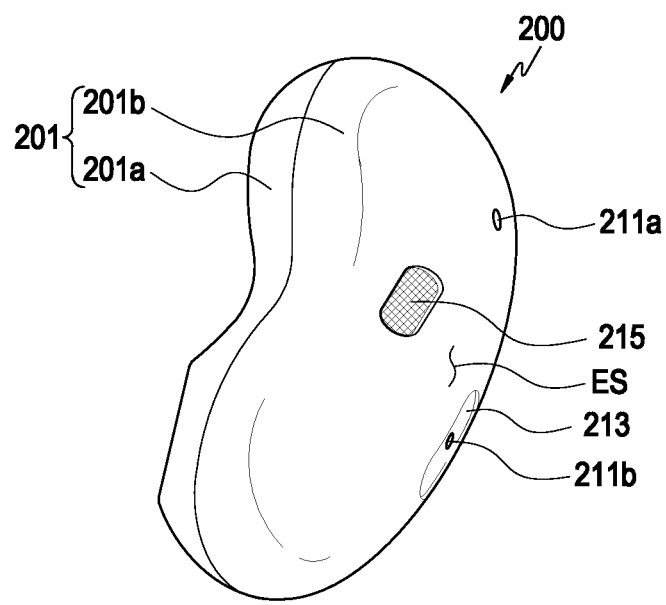
FIG. 3 is a perspective view illustrating the electronic device viewed from another direction according to various embodiments of the disclosure.

FIG. 2 is a perspective view illustrating an electronic device 200 (e.g., the electronic device 101, 102 or 104 of FIG. 1) according to various embodiments of the disclosure. FIG. 3 is a perspective view illustrating the electronic device 200 viewed from another direction according to various embodiments of the disclosure.

Figure 6:
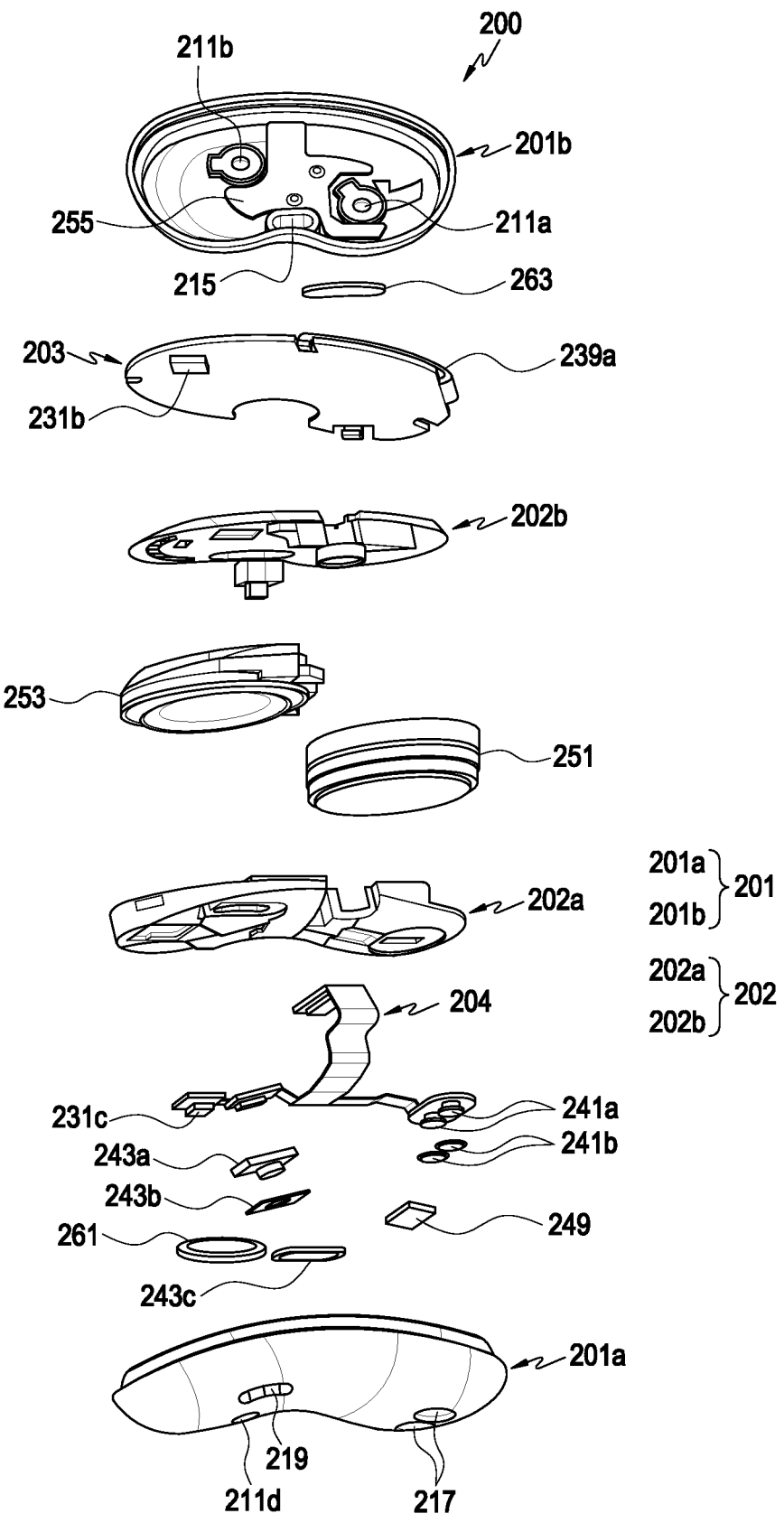
FIG. 6 is an exploded perspective view illustrating the electronic device according to various embodiments of the disclosure.

Referring to FIGS. 2 and 3, the electronic device 200 may include a housing 201 and various structures and/or electrical components (e.g., as seen in FIG. 6) accommodated within an inner space of the housing 201. The housing 201 may include, for example, a first case 201a and a second case 201b, and define the space in which the various structures and/or the electrical components are accommodated when the first case 201a and the second case 201b face each other and are coupled together. In an some embodiments, the first case 201a and/or the second case 201b may be formed of ceramic, polymer, metal, or a combination of at least two of them, and include at least one coating layer formed on an outer surface or an inner surface thereof. Since the electronic device 200 is used while being worn on a user's body, the material(s) of the first case 201a and/or the second case 201b may be appropriately selected or combined in consideration of the weight or wearability of the electronic device 200.

Figure 5:
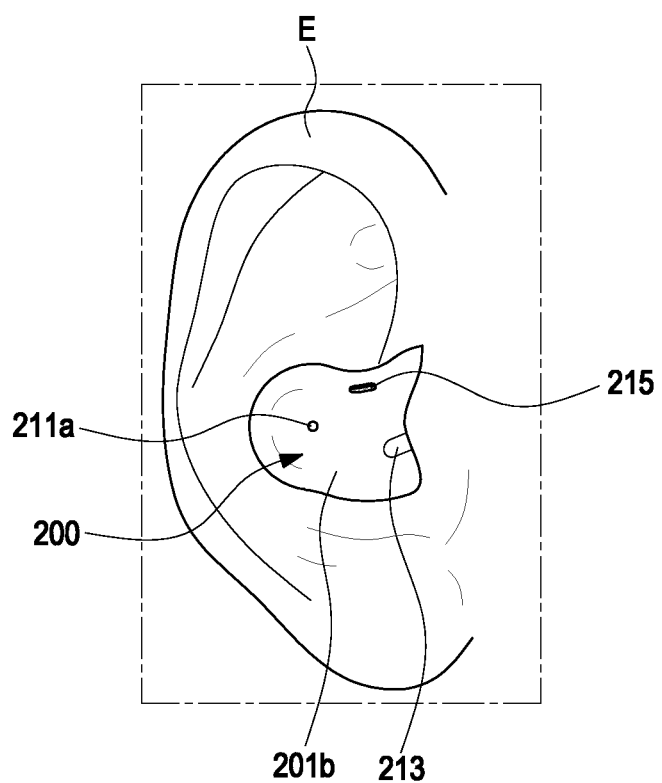
FIG. 5 is a diagram illustrating the electronic device worn on a user's body according to various embodiments of the disclosure.

In some embodiments, the electronic device 200 may include a plurality of acoustic holes 211a, 211b, and 211c, an acoustic dimple 213, and/or a plurality of electrodes 241a. In some embodiments, when the electronic device 200 is worn on the user's body, the first case 201a may be disposed to substantially face the user's body so that an outer surface CS of the first case 201a comes into contact with the user's body, and the second case 201b may face an external space. In some embodiments, a part of the outer surface ES of the second case 201b may be exposed to the external space, with the other part thereof concealed by the user's body according to the shape of the user's body (e.g., an ear E as seen in FIG. 5) or the wearing state of the electronic device 200. In some embodiments, the part of the outer surface ES of the second case 201b concealed by the user's body may come into contact with the user's body.

In some embodiments, the first acoustic hole 211a and the second acoustic hole 211b among the plurality of acoustic holes 211a, 211b, and 211c may be formed to pass through the second case 201b at different positions. For example, the electronic device 200 may receive external sounds (e.g., the user's voice or a sound from an ambient environment) through at least two different paths (e.g., a first microphone 231a to a third microphone 231c as seen in FIG. 6). In some embodiments, the acoustic dimple 213 may be recessed into the outer surface ES of the second case 201b. The acoustic dimple 213 may include a recess structure having an outer diameter larger than that of the second acoustic hole 211b, and have a shape extending in one direction from a position where the second acoustic hole 211b is formed. For example, the acoustic dimple 213 may be shaped into a rectangle with rounded corners, including the second acoustic hole 211b which is circular. According to various embodiments, it will be readily understood by those skilled in the art that the second acoustic hole 211b and the acoustic dimple 213 may be formed in various shapes. For example, the second acoustic hole 211b may be elliptical, and the acoustic dimple 213 may be shaped into an elongated oval including the second acoustic hole 211b. Alternatively, the acoustic dimple 213 may be narrower in shape, as it is nearer to exposed areas EA1 and EA2.

In some embodiments, the second acoustic hole 211b may extend from the acoustic dimple 213 to the inside of the second case 201b. For example, the second acoustic hole 211b together with the acoustic dimple 213 may form a sound path through which an external sound is received by a second microphone (e.g., a second microphone 231b as seen in FIG. 6). Among the plurality of acoustic holes 211a, 211b, and 211c, the third acoustic hole 211c may be formed to penetrate the first case 201a, and a sound output from a speaker unit (e.g., a speaker unit as seen in FIG. 6) built in the housing 201 may be radiated to the outside through the third acoustic hole 211c. In some embodiments, the third acoustic hole 211c may form a sound path through which an external sound is received by a third microphone (e.g., the third microphone 231c as seen in FIG. 6), for example, an in-ear microphone, while radiating the sound output from the speaker unit 253. In some embodiments, the electronic device 200 may process an acoustic signal based on a sound received through each of the first acoustic hole 211a, the second acoustic hole 211b, and/or the third acoustic hole 211c. As used in this disclosure, the phrase "the electronic device 200 processes an acoustic signal" may be interpreted as including acoustic signal processing for performing at least one of acoustic beamforming, ANC, EC, NS, and/or FF.

In some embodiments, the electronic device 200 may further include a dummy hole 211d formed to penetrate the first case 201a at a position different from that of the third acoustic hole 211c. In some embodiments, the dummy hole 211d may be used as a path through which a sound is received by the third microphone 231c. In some embodiments, with the electronic device 200 worn on the user, the dummy hole 211d may function as a second vent that adjusts a pressure inside the ear canal in correspondence with the pressure of an external environment, together with a vent hole 215. In some embodiments, a sensor (e.g., a proximity sensor 243a as seen in FIG. 6) to be described later may be disposed in correspondence with the dummy hole 211d. For example, the dummy hole 211d may provide a function such as a sound path, a gas path, or a light path in an actually manufactured product.

In some embodiments, the plurality of electrodes 241a may be, for example, electrodes for receiving charging power, and may be exposed from the outer surface of the first case 201a. Since the outer surface CS of the first case 201a may be configured to substantially contact the user's body, the plurality of electrodes 241a may be visually concealed while the electronic device 200 is worn on the user's body. In some embodiments, the electronic device 200 may receive charging power in an inductive or resonant manner. For example, the electronic device 200 may receive charging power wirelessly even without the plurality of electrodes 241a exposed from the outer surface of the first case 201a. In some embodiments, it will be readily understood by those skilled in the art that the plurality of electrodes 241a may different in at least one of shape or material.

In some embodiments, the electronic device 200 may further include an optical window 219 and/or the vent hole 215. The optical window 219 may be exposed, for example, through the outer surface of the first case 201a, and as the electronic device 200 includes a sensor (e.g., the proximity sensor 243a as seen in FIG. 6) disposed in correspondence with the optical window 219. By including the proximity sensor 243a, the electronic device 200 may detect whether the electronic device 200 is worn on the user's body. The vent hole 215 may be formed to penetrate the second case 201b, and may be exposed to the external space while the user wears the electronic device 200. In some embodiments, when electrical components inside the housing 201 generate heat, the vent hole 215 may induce or radiate heat inside the housing 201 to the outside. In some embodiments, when the speaker unit (e.g., the speaker unit 253 as seen in FIG. 6) is built in the housing 201, the vent hole 215 may provide an environment in which the speaker unit (e.g., a diaphragm) may operate stably. In some embodiments, as the electronic device 200 includes a screen member (e.g., a screen member 263 as seen in FIG. 3) disposed on the vent hole 215, the electronic device 200 may block introduction of an external foreign material, for example, dust into the housing 201, while allowing circulation of heat or gas through the vent hole 215.

Figure 4A:
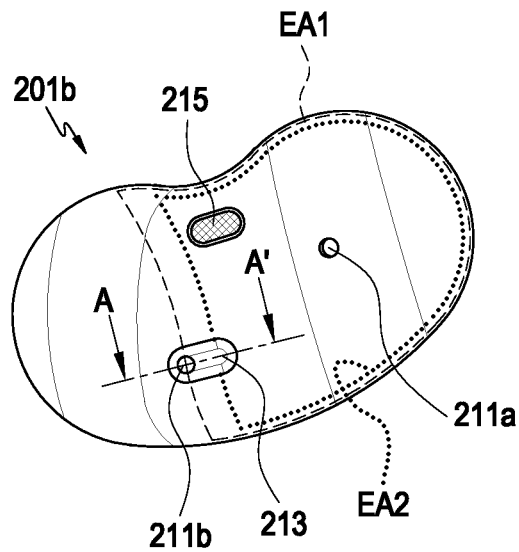
FIG. 4A is a plan view illustrating a second case in the electronic device according to various embodiments of the disclosure.
Figure 4B:
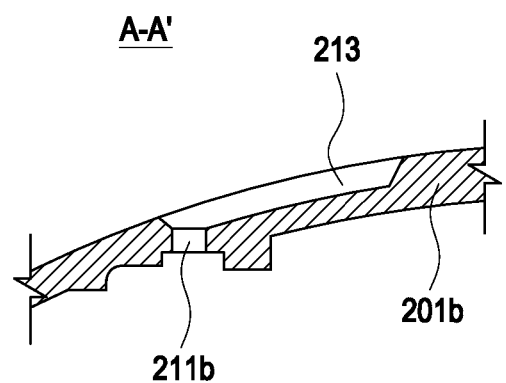
FIG. 4B is a cross-sectional view illustrating the cut-away second case in the electronic device according to various embodiments of the disclosure, taken along line A-A' of FIG. 4A.

FIG. 4A is a plan view illustrating the second case 201b in the electronic device 200 (e.g., the electronic device 101, 102 or 104 as seen in FIG. 1) according to various embodiments of the disclosure. FIG. 4B is a cross-sectional view illustrating the second case 201b in the electronic device 200 according to various embodiments of the disclosure, taken along line A-A' of FIG. 4A. FIG. 5 is a diagram illustrating the electronic device 200 worn on the user's body according to various embodiments of the disclosure.

Figure 8:
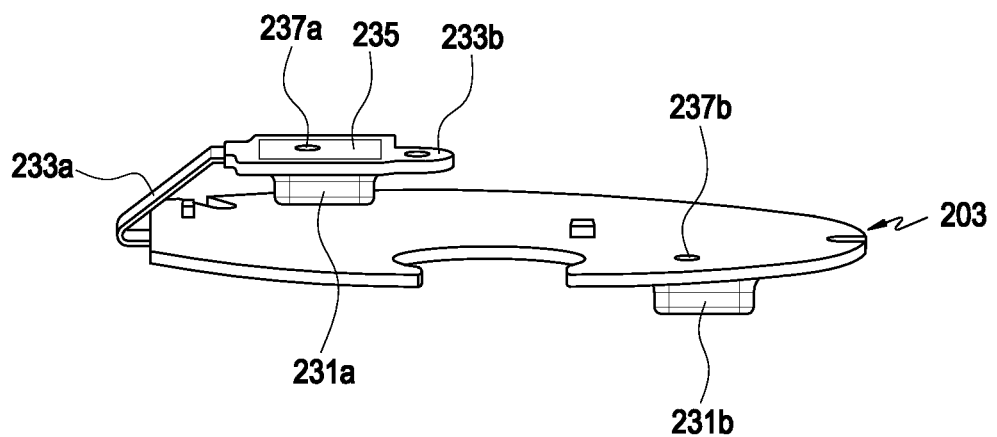
FIG. 8 is a perspective view illustrating a first circuit board in the electronic device according to various embodiments of the disclosure.

Referring to FIGS. 4A to 5, with the electronic device 200 worn on the user, part of the outer surface (e.g., the outer surface ES as seen in FIG. 2) of the second case 201b, for example the exposed areas EA1 and EA2, may be exposed to the external environment. The exposed areas EA1 and EA2 may be different depending on the shape of the user's body (e.g., ear) or the wearing state of the electronic device 200. As a distance between microphones (e.g., the first microphone 231a and the second microphone 231b as seen in FIG. 8) or a distance between acoustic holes (e.g., the first acoustic hole 211a and the second acoustic hole 211b) is larger, a function such as acoustic beamforming or ANC may be implemented more easily. In an electronic device miniaturized enough to be worn or supported in a space formed by a body structure such as a tragus, an antitragus, and/or an antihelix, it may be difficult to secure a sufficient distance between microphones or acoustic holes. For example, if a sufficient distance (e.g., about 12 mm or more) is secured between the plurality of acoustic holes (e.g., the first acoustic hole and the second acoustic hole), one (e.g., the second acoustic hole) of the plurality of acoustic holes may be covered by the user's body (e.g., tragus), in the state where the electronic device 200 is worn on the user's body.

In some embodiments, as illustrated in FIG. 4A, when a first exposed area EA1 is defined by the shape of the user's body or the wearing state, the first acoustic hole 211a may be located in the first exposed area EA1, and a second acoustic hole 211b may be partially covered by the user's body. When the second exposed area EA2 smaller than the first exposed area EA1 is defined by the shape of the user's body or the wearing state, the first acoustic hole 211a may be located in the second exposed area EA2, and at least part of the second acoustic hole 211b may be substantially covered by the user's body. For example, a sound or a sound pressure received through the second acoustic hole 211b may vary depending on the shape of the user's body or the wearing state. In some embodiments, the acoustic dimple 213 may be at least partially positioned in the exposed areas EA1 and EA2, while extending from the second acoustic hole 211b. For example, even when the second acoustic hole 211b is partially or substantially covered by the user's body, the electronic device 200 may receive or obtain a sound input to the second acoustic hole 211b via the acoustic dimple 213. As described with reference to FIG. 10, in a structure in which the second acoustic hole 211b is covered by the user's body in a worn state, the formation of the acoustic dimple 213a may bring an approximately 40 dB improvement in a sound pressure level obtained by the electronic device 200 in a specified frequency band.

Figure 7:
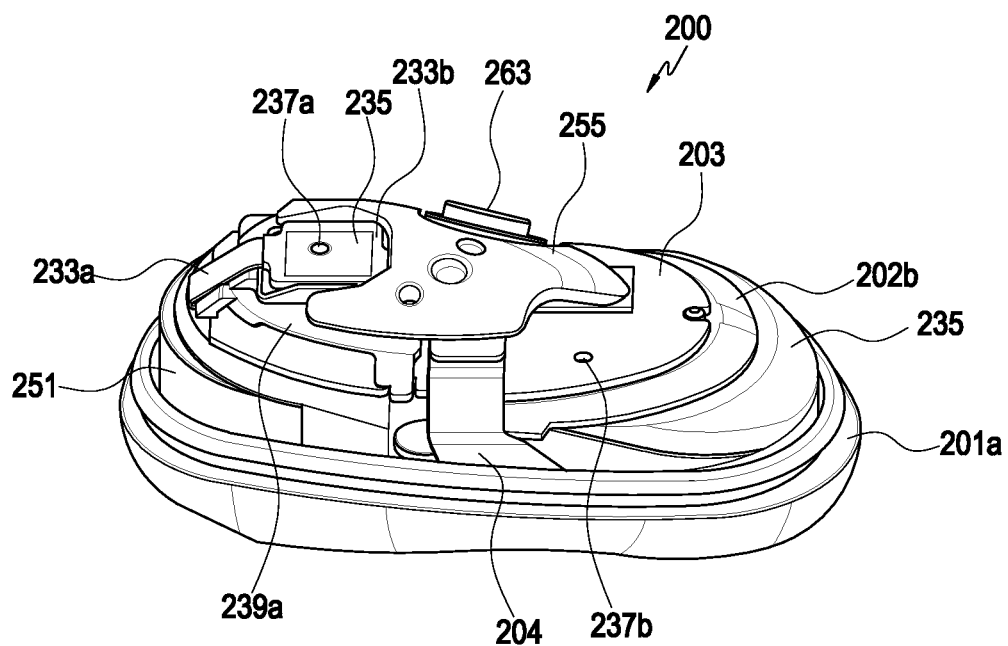
FIG. 7 is a perspective view illustrating the electronic device with the second case removed therefrom according to various embodiments of the disclosure.

FIG. 6 is an exploded perspective view illustrating the electronic device 200 (e.g., the electronic device 101, 102, 104, or 200 of FIG. 1 or FIG. 2) according to various embodiments of the disclosure. FIG. 7 is a perspective view illustrating the electronic device 200 with the second case (e.g., the second case 201b of FIG. 4A) removed therefrom according to various embodiments of the disclosure.

Referring to FIGS. 6 and 7, the electronic device 200 may include the housing 201, a support structure 202, a first circuit board 203, a second circuit board 204, a battery 251, the speaker unit 253, and/or an antenna member 255. The electronic device 200 may receive or obtain an external sound, for example, the user's voice or a sound from an ambient environment by including the plurality of microphones 231a, 231b, and 231c (see FIG. 8 for the first microphone 213a) disposed on the first circuit board 203 and/or the second circuit board 204. In some embodiments, the housing 201 may include the first case 201a configured to contact the user's body, and the second case 201b coupled with the first case 201a to face the first case 201a. With the electronic device 200 worn on the user's body, the first case 201 may substantially contact the user's body, and the second case 201b may be at least partially exposed to the outside.

In some embodiments, the support structure 202 may include a first support member 202a and a second support member 202b coupled to face each other. The first support member 202a and/or the second support member 202b may be formed of at least one of a polymer or a metal material, and accommodated in the housing 201 to increase the rigidity of the electronic device 200. In some embodiments, the support structure 202 may divide the inner space of the housing 201 into a plurality of spaces. For example, the first circuit board 203 and the second circuit board 204 may be disposed inside the housing 201, spaced apart from each other by a predetermined distance by the support structure 202. In some embodiments, the battery 251 and/or the speaker unit 253 may be disposed within the housing 202, while substantially surrounded by the support structure 202. A space in which the battery 251 and/or the speaker unit 253 are disposed may be separated from a space in which the first circuit board 203 and/or the second circuit board 204 are disposed by the support structure 202.

In some embodiments, the first circuit board 203 may be substantially a main circuit board of the electronic device 200, and at least some of the components described with reference to FIG. 1 may be disposed in the form of an integrated circuit chip on the first circuit board 203. The first circuit board 203 may be disposed to face the inner surface of the second case 201b. For example, the first circuit board 203 may be disposed between the second case 201b and the second support member 202b. A plurality (e.g., a pair) of microphones 231a and 231b may be disposed on the first circuit board 203, and an embodiment thereof will be described in more detail with reference to FIGS. 8 and 9. The second circuit board 204 may include a flexible printed circuit board, may be disposed to substantially face the inner surface of the first case 201a, and may be electrically connected to the first circuit board 203, bypassing the support structure 202.

In some embodiments, the plurality of electrodes 241a of FIG. 2 may be substantially disposed on the second circuit board 204 and exposed to the outside through the electrode holes 217 formed in the first case 201a. In some embodiments, the electronic device 200 may include sealing members, for example, O-rings 241b formed of an elastic material such as silicone or rubber. The O-rings 241b may be coupled to surround the electrodes 241a and substantially seal gaps between inner walls of the electrode holes 217 and the electrodes 241a. In some embodiments, one (e.g., the third microphone 231c) of the plurality of microphones may be disposed on the second circuit board 204 in correspondence with either the third acoustic hole 211c or the dummy hole 211d. For example, the third microphone 231c may receive or obtain a sound input through either the third acoustic hole 211c or the dummy hole 211d formed in the first case 201a. In some embodiments, the electronic device 200 may further include a sensor disposed on the second circuit board 204, for example, the proximity sensor 243a. The proximity sensor 243a may be mounted in the first case 201a by an adhesive member 243b and disposed in correspondence with the optical window 219 formed in the first case 201a. For example, the proximity sensor 243a may detect whether an external object (e.g., the user's body) approaches the electronic device 200 or is maintained in contact state with the electronic device 200 for a specified time or longer, through the optical window 219. The optical window 243c may include a glass member that transmits at least part of visible light or infrared light. According to information sensed through the proximity sensor 243a, the electronic device 200, for example, the processor 120 as seen in FIG. 1 may determine whether the electronic device 200 is worn on the user's body.

In some embodiments, the battery 251 may be mounted or fixed between the support structure 202, for example, the first support member 202a and the second support member 202b. The battery 251 may be a device for supplying power to at least one component of the electronic device 200, and may include, for example, a non-rechargeable primary battery, a rechargeable secondary battery, or a fuel cell. The battery 251 may be integrally disposed inside the electronic device 200, and configured to be replaced by the user. In some embodiments, battery 251 may be charged by power supplied through electrodes 241a. In some embodiments, the speaker unit 253 may be disposed on one side of the battery 251. For example, the speaker unit 253 may be mounted or fixed between the first support member 202a and the second support member 202b and thus disposed in parallel with the battery 251. In some embodiment, a sound output from the speaker unit 253 may be radiated to the outside of the housing 201 or the electronic device 200 through a third acoustic hole (e.g., the third acoustic hole 211c as seen in FIG. 2) formed in the first case 201a. In some embodiments, the third acoustic hole 211c may be larger than the first acoustic hole 211a and/or the second acoustic hole 211b. The electronic device 200 may further include another screen member 261 disposed on the third acoustic hole 211c, to block introduction of an external foreign material (e.g., dust) into the housing, while radiating a sound output from the speaker unit 253 to the outside.

In some embodiments, the electronic device 200 may further include a magnetic body 249 disposed on the inner surface of the first case 201a. The user may carry or keep the electronic device 200 by accommodating it in a dedicated case (not shown). The electronic device 200 mounted in the dedicated case may receive charging power through the dedicated case. With the electronic device 200 accommodated in the dedicated case, a magnetic force (e.g., attractive force) may be generated between the magnetic body 249 and the dedicated case, thereby fixing the electronic device 200 in the dedicated case. For example, in the state where the electronic device 200 is mounted in the dedicated case, the electronic device 200 may be stably fixed in the dedicated case in spite of an external force within a specified size range.

In some embodiments, the antenna member 255 (e.g., the antenna module 197 as seen in FIG. 1) may be disposed on the inner surface of the second case 201b, and electrically connected to, for example, the processor 120 or the communication module 190 of FIG. 1. For example, the processor 120 or the communication module 190 may perform wireless communication (e.g., Bluetooth communication) using the antenna member 255. In some embodiments, when the user plays music on an external electronic device (e.g., the electronic devices 102 or 104 of FIG. 1), for example, a smart phone connected to the electronic device 200 through short-range communication (e.g., Bluetooth), the electronic device 200 may receive data (e.g., a sound packet) of the played music and output the received data as a sound through the speaker unit 253.

In some embodiments, at least two (e.g., the first microphone 231a and the second microphone 231b as seen in FIG. 8) of the plurality of microphones may be provided on the first circuit board 203. An embodiment of the arrangement structure of the first circuit board 203, the first microphone 231a, and/or the second microphone 231b will be described with further reference to FIGS. 8 and 9.

Figure 9:
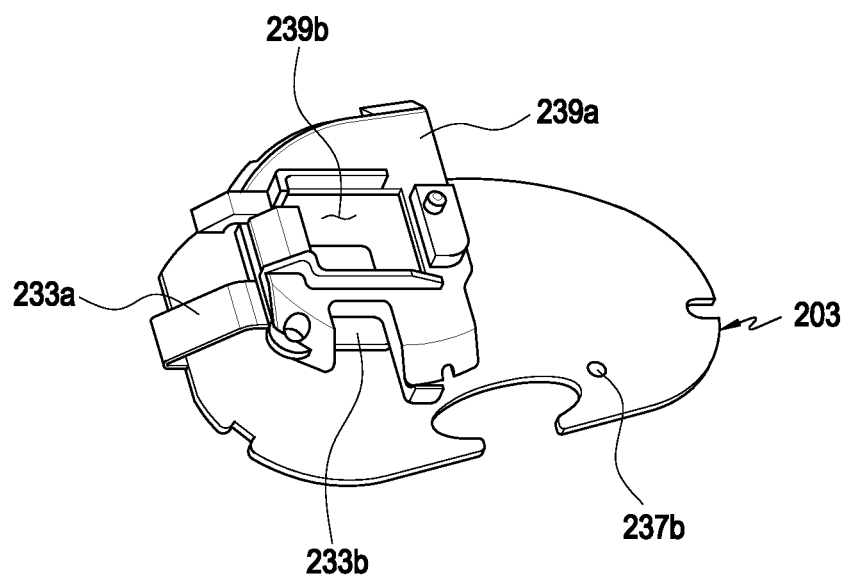
FIG. 9 is an exploded perspective view illustrating an arrangement structure of a bracket in the electronic device according to various embodiments of the disclosure.

FIG. 8 is a perspective view illustrating the first circuit board 203 in the electronic device (e.g., the electronic device 200 of FIG. 2 as seen in FIG. 6) according to various embodiments of the disclosure. FIG. 9 is an exploded perspective view illustrating an arrangement structure of a bracket 239a in the electronic device 200 according to various embodiments of the disclosure.

Referring further to FIGS. 8 and 9 together with FIGS. 6 and 7, the electronic device 200 may include a flexible printed circuit board 233a extending from the first circuit board 203, the first circuit board 203, and the bracket 239a mounted to face the first circuit board 203. The first microphone 231a among the plurality of microphones may be mounted on the flexible printed circuit board 233a and electrically connected to the first circuit board 203, and the second microphone 231b among the plurality of microphones may be mounted on the first circuit board 203. In some embodiments, the flexible printed circuit board 233a may extend from the first microphone 231a and may be electrically connected to the first circuit board 203. For example, the flexible printed circuit board 233a may electrically connect the first microphone 231a to the first circuit board 203. In some embodiments, the electronic device 200 may further include a dummy board 233b provided at an end of the flexible printed circuit board 233a, and the first microphone 231a may be mounted on the dummy board 233b.

In some embodiments, the first microphone 231a may be disposed in correspondence with the first acoustic hole 211a formed in the second case 201b, and the second microphone 211b may be disposed in correspondence with the second acoustic hole 211b formed in the second case 201b. For example, the first microphone 231a may receive or obtain a sound input through the first acoustic hole 211a, and the second microphone 231b may receive or obtain a sound input through the second acoustic hole 211b. In some embodiments, the sound received or obtained through the second microphone 231b may at least partially pass through the acoustic dimple (e.g., the acoustic dimple 213 of FIGS. 3 to 4B).

In some embodiments, the first circuit board 203 may be disposed to face the inner surface of the second case 201b, and the first microphone 231a may be disposed between the first circuit board 203 and the inner surface of the second case 201b. The second microphone 231b may be mounted on the first circuit board 203 and disposed to face the inner surface of the second case 201b, with the first circuit board 203 interposed therebetween. For example, the first circuit board 203 may be disposed at least partially between the second microphone 231b and the inner surface of the second case 201b. In some embodiments, the first microphone 231a and the second microphone 231b may be disposed at different heights with respect to the first circuit board 203. In some embodiments, the inner surface or the outer surface of the second case 201b may have a curved shape, and the first acoustic hole 211a and the second acoustic hole 211b may be formed at different heights with respect to the first circuit board 203. In some embodiments, in a structure in which the second case 201b has a curved shape, the first microphone 231a may be disposed adjacent to the first acoustic hole 211a, and the second microphone 231b may be disposed adjacent to the second acoustic hole 211b.

In some embodiments, the electronic device 200 may further include dummy holes 237a and 237b formed to penetrate the first circuit board 203 and/or the dummy board 233b. A first dummy hole 237a of the dummy holes may provide a sound input path running from the first acoustic hole 211a through the dummy board 233b to the first microphone 231a, and a second dummy hole 237b of the dummy holes may provide a sound input path running from the second acoustic hole 211b to the second microphone 231b through the first circuit board 203. While not shown, sealing members may be disposed between the dummy board 233b and the inner surface of the second case 201b and/or between the first circuit board 203 and the inner surface of the second case 201b. One of the sealing members may form a sealing structure between the dummy board 233b and the inner surface of the second case 201b at a position where the first acoustic hole 211a and the first dummy hole 237a are formed, and the other one of the sealing members may form a sealing structure between the first circuit board 203 and the inner surface of the second case 201b at a position where the second acoustic hole 211b and the second dummy hole 237b are formed.

In some embodiments, the electronic device 200 may further include a touch sensor 235 provided on the dummy board 233b. The touch sensor 235 may be electrically connected to the first circuit board 203 through the flexible printed circuit board 233a and disposed to face the inner surface of the second case 201b. According to an embodiment, the touch sensor 235 may generate an input signal by sensing that the user's body (e.g., a finger) approaches or contacts the outer surface of the second case 201b, or a designated action is taken within a specified distance from the outer surface of the second case 201b. In some embodiments, when the user comes into slip contact with the outer surface of the second case 201b or the user's body may be maintained within a specified distance for a specified time or longer, the touch sensor 235 may sense this and generate an input signal.

In some embodiments, the bracket 239a may be disposed between the inner surface of the second case 201b and the first circuit board 203, and mounted substantially on any one surface of the first circuit board 203. While not denoted by a reference numeral, the bracket 239a may include a plurality of hooks, and the hooks may be fastened to an edge of the first circuit board 203 to fix the bracket 239a to the first circuit board 203. In some embodiments, the second support member 202b may be provided with a fastening protrusion which is not shown. The fastening protrusion may penetrate the first circuit board 203 or bypass the first circuit board 203 to be fastened to the bracket 239a. As such, the structure(s) for mounting or fixing the bracket 239a on the first circuit board 203 may be appropriately selected or combined according to the shape of the first circuit board 203 or the arrangement of electrical components (e.g., the first microphone 231a and/or the second microphone 231b).

In some embodiments, the first microphone 231a, for example, the dummy board 233b may be mounted on the bracket 239a to face the inner surface of the second case 201b. In some embodiments, the first microphone 231a may be disposed to face the inner surface of the second case 201b, substantially with the dummy board 233b interposed therebetween, and protrude from any one surface of the dummy board 233b. In a structure in which the first microphone 233b protrudes from the dummy board 233b, the bracket 239a may include an accommodation hole 239b to accommodate at least part of the first microphone 231a. For example, the at least part of the first microphone 231a may be disposed on the first circuit board 203 at substantially the same height as the bracket 239a.

In some embodiments, as the first microphone 231a and the second microphone 231b are disposed at different heights on the first circuit board 203, a larger distance may further be secured between the first microphone 231a and the second microphone 231b. For example, when distances measured in a direction parallel to the first circuit board 203 are the same, the distance between the first microphone 231a and the second microphone 231b may be larger, as the first microphone 231a and the second microphone 231b are disposed at different heights or the height difference between the first microphone 231a and the second microphone 231b increases. For example, the electronic device 200 may secure a sufficient distance between a plurality of microphones (e.g., the first microphone 231a and the second microphone 231b), while being accommodated or worn in a space surrounded by the user's body (e.g., ear) structure. It has been mentioned before that when a sufficient distance between the plurality of microphones is secured, acoustic signal processing such as acoustic beamforming, ANC, EC, NS, and/or FF may be implemented more effectively.

In some embodiments, as a sound is received or obtained through a plurality of microphones (e.g., the first microphone 231a and the second microphone 231b), the quality of the sound obtained by the electronic device 200 or provided to the user may be improved. For example, even though the same sound may be received, different sound qualities may be obtained from two different microphones (e.g., the first microphone 231a and the second microphone 231b), and a processor or an input module (e.g., the processor 120 or the input module 150 as seen in FIG. 1) may compare or process sounds obtained through the first microphone 231a and the second microphone 231b. The quality of the sound obtained through the electronic device 200 or provided to the user may be improved through this sound comparison or processing. According to an embodiment, in voice call mode, the electronic device 200 may obtain the user's voice while generating a sound that suppresses or cancels noise generated from the ambient environment. According to another embodiment, in multimedia mode such as music play or video play, for example, when outputting a sound, the electronic device 200 may reproduce a sound provided from an external electronic device (e.g., the electronic device 102 or 104 of FIG. 1). Herein, while outputting a sound cancelling a sound generated from the ambient environment, the electronic device 200 may provide the sound provided from the external electronic device to the user.

In some embodiments, as described with reference to FIGS. 4A and 4B, one (e.g., the second acoustic hole 211b) of the plurality of acoustic holes may be at least partially covered by the user's body in the state where the electronic device 200 is worn on the user's body. For example, with the electronic device 200 worn on the user's body, it may be difficult for one (e.g., the second microphone 231b) of the plurality of microphones to appropriately receive or obtain a sound. Because the electronic device 200 according to various embodiments of the disclosure includes the acoustic dimple 213, the user's voice or a sound of the ambient environment may be input to the second acoustic hole 211b via the acoustic dimple 213, even though the second acoustic hole 231b is covered by the user's body. In some embodiments, the result of measuring the sound pressure level of a sound received through the second microphone 231b in the state where the second acoustic hole 211b is covered by the user's body will be described with reference to FIG. 10.

Figure 10:
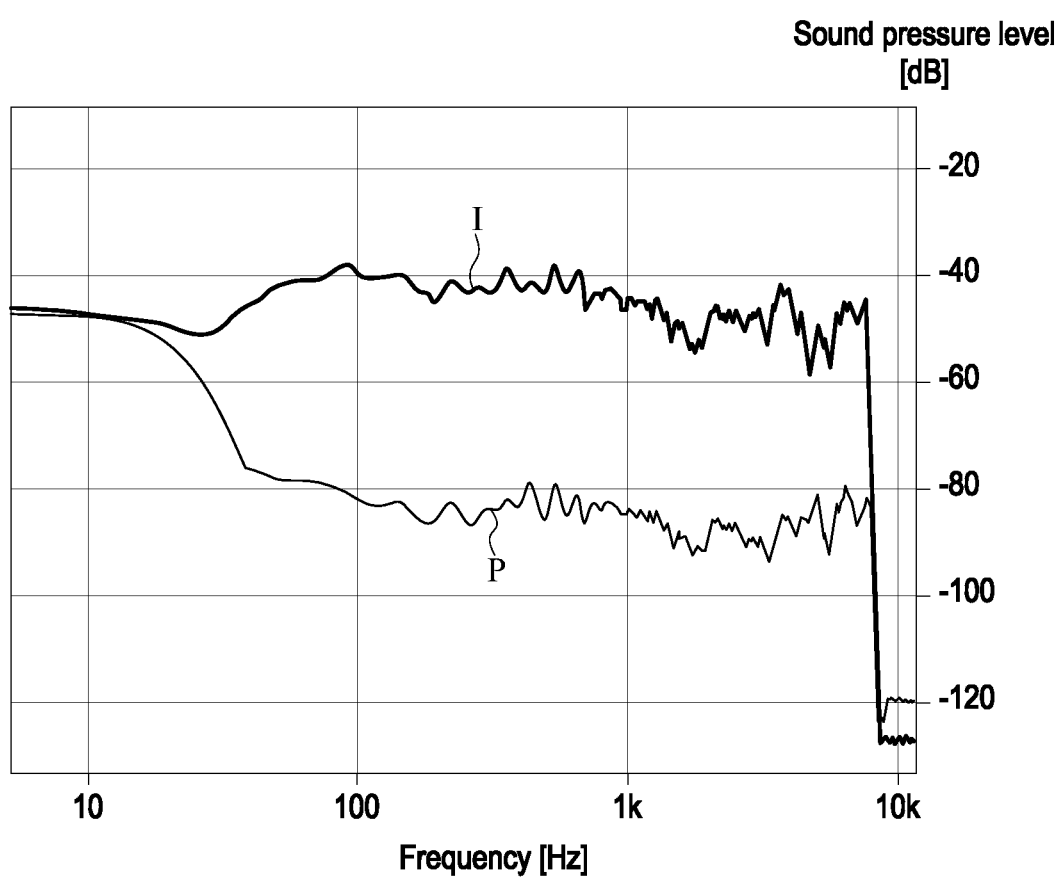
FIG. 10 is a graph illustrating measured sound pressure levels of the electronic device according to various embodiments of the disclosure.

FIG. 10 is a graph illustrating measured sound pressure levels of the electronic device (e.g., the electronic device 200 of FIG. 2 or FIG. 6) according to various embodiments of the disclosure.

In FIG. 10, a curve denoted by 'P' may represent sound pressure levels obtained through a microphone corresponding to a second acoustic hole in an electronic device having a structure without an acoustic dimple (e.g., the acoustic dimple 213 of FIGS. 3 to 4B) according to a comparative example, and a curve denoted by 'I' may represent sound pressure levels obtained through the second microphone 231b in the electronic device 200. For example, the curve denoted by 'I' may represent sound pressure levels obtained through the second microphone 231b in the electronic device 200 including the acoustic dimple 213 as seen in FIGS. 3 to 4B. As noted from FIG. 10, when the second acoustic hole (e.g., the second acoustic hole 211b of FIGS. 3 to 4B) is covered by the user's body in the structure without the acoustic dimple, a sound pressure level obtained through the second microphone 231b may only be about −80 to −95 dB. In the structure with the acoustic dimple 213, even though the second acoustic hole 211b may be covered by the user's body, it may be noted that a sound pressure level obtained through the second microphone 231b may be improved to be approximately −40 to −55 dB. For example, it may be fully expected that an external sound (e.g., the user's voice or a sound generated in the ambient environment) may reach the second microphone 231b via the acoustic dimple 213 in the structure with the acoustic hole 213. Accordingly, the electronic device 200 according to various embodiments of the disclosure may be miniaturized to be readily worn on the user's body, and may obtain enough sound through the plurality of microphones (e.g., the first microphone 231a and the second microphone 231b). For example, the electronic device 200 according to various embodiments of the disclosure may provide a sound with improved quality to the user or improve the quality of an obtained sound by effectively performing acoustic signal processing such as acoustic beamforming, ANC, EC, NS, and/or FF.

As described above, in some embodiments of the disclosure, an electronic device (e.g., the electronic device 101, 102, 104, or 200 as seen in FIG. 1, FIG. 2, or FIG. 6) may include a first case (e.g., the first case 201a as seen in FIG. 2 or FIG. 6) configured to at least partially contact a user's body when the electronic device is worn on the body, a second case (e.g., the second case 201b as seen in FIG. 3, FIG. 4A, FIG. 4B, or FIG. 6) coupled to the first case, the second case being configured to, at an exposed area on an outer surface of the second case, be exposed (e.g., the area denoted by 'EA1' or 'EA2' in FIG. 4A) when the electronic device is worn on the body, a first acoustic hole (e.g., the first acoustic hole 211a as seen in FIG. 3 or FIG. 4A) configured to penetrate the second case in the exposed area, a second acoustic hole (e.g., the second acoustic hole 211b as seen in FIGS. 3 to 4B) configured to penetrate the second case at a position different from the first acoustic hole, and an acoustic dimple (e.g., the acoustic dimple 213 as seen in FIGS. 3 to 4B) recessed into an outer surface of the second case and extending from the second acoustic hole.

In some embodiments, the acoustic dimple may be located at least partially within the exposed area.

In some embodiments, the electronic device may further include a first microphone (e.g., the first microphone 213a as seen in FIG. 8) disposed inside the second case in correspondence with the first acoustic hole, and a second microphone (e.g., the second microphone 231b as seen in FIG. 6 or FIG. 8) disposed inside the second case in correspondence with the second acoustic hole.

In some embodiments, the second microphone may be configured to receive at least part of a sound passing through the acoustic dimple.

In some embodiments, the electronic device may further include a circuit board (e.g., the first circuit board 203 as seen in FIG. 6 or FIG. 8) configured to face an inner surface of the second case. The first microphone may be disposed between the inner surface of the second case and the circuit board, and the second microphone may be configured to face the inner surface of the second case, with the circuit board interposed therebetween.

In some embodiments, the electronic device may further include a dummy hole (e.g., the second dummy hole 237b as seen in FIG. 8) configured to penetrate the circuit board, and the dummy hole may be located between the second acoustic hole and the second microphone.

In some embodiments, the electronic device may further include a circuit board configured to face an inner surface of the second case, and a bracket (e.g., the bracket 239a as seen in FIG. 9) disposed between the inner surface of the second case and the circuit board. The first microphone may be mounted on the bracket, and the second microphone may be mounted on the circuit board to face the inner surface of the second case, with the circuit board interposed therebetween.

In some embodiments, the electronic device may further include a flexible printed circuit board (e.g., the flexible printed circuit board 233a as seen in FIG. 8 or FIG. 9) extending from the first microphone, and the flexible printed circuit board may be electrically connected to the circuit board.

In some embodiments, the electronic device may further include a touch sensor (e.g., the touch sensor 235 as seen in FIG. 7 or FIG. 8) provided on the first microphone and configured to face an inner surface of the second case.

In some embodiments, the electronic device may further include a third acoustic hole (e.g., the third acoustic hole 211c as seen in FIG. 2) configured to penetrate the first case, and a speaker (e.g., the speaker unit 235 as seen in FIG. 6 or FIG. 7) disposed inside the first case and configured to output a sound through the third acoustic hole.

In some embodiments, the electronic device may further include a screen (e.g., the screen member 261 as seen in FIG. 6) mounted in the first case and disposed on the third acoustic hole.

In some embodiments, the electronic device may further include an antenna (e.g., the antenna member 255 as seen in FIG. 6 or FIG. 7) mounted on an inner surface of the second case.

In some embodiments of the disclosure, the electronic device may further include a first microphone disposed inside the second case in correspondence with the first acoustic hole, a second microphone disposed inside the second case in correspondence with the second acoustic hole, and a processor (e.g., the processor 120 as seen in FIG. 1). The acoustic dimple may be located at least partially within the exposed area. The processor may be configured to receive a sound signal using at least one of the first microphone or the second microphone.

In some embodiments, the electronic device may further include a communication module, and an antenna mounted on an inner surface of the second case. The processor or the communication module may be configured to perform wireless communication using the antenna.

In some embodiments, the electronic device may further include a third acoustic hole configured to penetrate the first case, a speaker disposed inside the first case and configured to output an output sound through the third acoustic hole, a dummy hole (e.g., the dummy hole 211d as seen in FIG. 2 or FIG. 6) configured to penetrate the first case, and a third microphone (e.g., the third microphone 231c as seen in FIG. 6) disposed inside the first case, the third microphone being configured to receive an input sound through the dummy hole.

In some embodiments, the electronic device may further include a proximity sensor (e.g., the proximity sensor 243a as seen in FIG. 6). The processor may be configured to determine whether the electronic device is being worn on the body based on data from the proximity sensor.

In some embodiments, the sound signal may include a first sound signal received from the first microphone and a second sound signal received from the second microphone. The processor may be configured to compare the first sound signal with the second sound signal to generate an improved sound signal.

In some embodiments, the processor being configured to generate the improved sound signal may include at least one of beamforming, active noise canceling (ANC), echo canceling (EC), noise suppression (NS), and feedforward (FF) based on the first sound signal and the second sound signal.

In some embodiments, a distance between the first acoustic hole and the second acoustic hole may be at least 12 millimeters.

While specific embodiments have been described above, it will be apparent to those skilled in the art that many modifications can be made without departing from the scope of the disclosure.

The invention claimed is:

1. An electronic device wearable on a body, the electronic device comprising:
   a first case configured to at least partially contact the body when the electronic device is worn on the body;
   a second case coupled to the first case, the second case being configured to, at an exposed area on an outer surface of the second case, be exposed when the electronic device is worn on the body;
   a first acoustic hole configured to penetrate the second case in the exposed area;
   a second acoustic hole configured to penetrate the second case at a position different from the first acoustic hole;
   an acoustic dimple recessed into the outer surface of the second case and extending from the second acoustic hole;
   a first microphone disposed inside the second case in correspondence with the first acoustic hole;
   a second microphone disposed inside the second case in correspondence with the second acoustic hole;
   a circuit board configured to face an inner surface of the second case; and
   a dummy hole configured to penetrate the circuit board and to provide a sound input path running from the second acoustic hole to the second microphone through the circuit board.

2. The electronic device of claim 1, wherein the acoustic dimple is located at least partially within the exposed area.

3. The electronic device of claim 1, wherein the second microphone is configured to receive at least part of a sound passing through the acoustic dimple.

4. The electronic device of claim 1,
   wherein the first microphone is disposed between the inner surface of the second case and the circuit board, and the second microphone is configured to face the inner surface of the second case, with the circuit board interposed therebetween.

5. The electronic device of claim 4,
   wherein the dummy hole is located between the second acoustic hole and the second microphone.

6. The electronic device of claim 1, further comprising a touch sensor provided on the first microphone and configured to face an inner surface of the second case.

7. The electronic device of claim 1, further comprising:
   a third acoustic hole configured to penetrate the first case; and
   a speaker disposed inside the first case and configured to output a sound through the third acoustic hole.

8. The electronic device of claim 7, further comprising a screen mounted in the first case and disposed on the third acoustic hole.

9. The electronic device of claim 1, further comprising an antenna mounted on an inner surface of the second case.

10. The electronic device of claim 1, further comprising:
    a processor,
    wherein the acoustic dimple is located at least partially within the exposed area, and
    wherein the processor is configured to receive a sound signal using at least one of the first microphone or the second microphone.

11. The electronic device of claim 10, further comprising:
a communication module; and
an antenna mounted on an inner surface of the second case,
wherein the processor or the communication module is configured to perform wireless communication using the antenna.

12. The electronic device of claim 10, further comprising a proximity sensor,
wherein the processor is configured to determine whether the electronic device is being worn on the body based on data from the proximity sensor.

13. The electronic device of claim 10,
wherein the sound signal comprises a first sound signal received from the first microphone and a second sound signal received from the second microphone,
wherein the processor is configured to compare the first sound signal with the second sound signal to generate an improved sound signal.

14. The electronic device claim 13, wherein the processor is configured to generate the improved sound signal by performing at least one of beamforming, active noise canceling (ANC), echo canceling (EC), noise suppression (NS), and feedforward (FF) based on the first sound signal and the second sound signal.

15. The electronic device of claim 14, wherein a distance between the first acoustic hole and the second acoustic hole is at least 12 millimeters.

16. The electronic device of claim 1, wherein a distance between the first acoustic hole and the second acoustic hole is at least 12 millimeters.

17. An electronic device wearable on a body, the electronic device comprising:
a first case configured to at least partially contact the body when the electronic device is worn on the body;
a second case coupled to the first case, the second case being configured to, at an exposed area on an outer surface of the second case, be exposed when the electronic device is worn on the body;
a first acoustic hole configured to penetrate the second case in the exposed area;
a second acoustic hole configured to penetrate the second case at a position different from the first acoustic hole;
an acoustic dimple recessed into the outer surface of the second case and extending from the second acoustic hole;
a first microphone disposed inside the second case in correspondence with the first acoustic hole;
a second microphone disposed inside the second case in correspondence with the second acoustic hole;
a circuit board configured to face an inner surface of the second case; and
a bracket disposed between the inner surface of the second case and the circuit board,
wherein the first microphone is mounted on the bracket, and the second microphone is mounted on the circuit board to face the inner surface of the second case, with the circuit board interposed therebetween.

18. The electronic device of claim 17, further comprising a flexible printed circuit board extending from the first microphone,
wherein the flexible printed circuit board is electrically connected to the circuit board.

19. An electronic device wearable on a body, the electronic device comprising:
a first case configured to at least partially contact the body when the electronic device is worn on the body;
a second case coupled to the first case, the second case being configured to, at an exposed area on an outer surface of the second case, be exposed when the electronic device is worn on the body;
a first acoustic hole configured to penetrate the second case in the exposed area;
a second acoustic hole configured to penetrate the second case at a position different from the first acoustic hole;
an acoustic dimple recessed into the outer surface of the second case and extending from the second acoustic hole, the acoustic dimple is located at least partially within the exposed area;
a first microphone disposed inside the second case in correspondence with the first acoustic hole;
a second microphone disposed inside the second case in correspondence with the second acoustic hole;
a processor configured to receive a sound signal using at least one of the first microphone or the second microphone;
a third acoustic hole configured to penetrate the first case;
a speaker disposed inside the first case and configured to output an output sound through the third acoustic hole;
a second dummy hole configured to penetrate the first case; and
a third microphone disposed inside the first case, the third microphone being configured to receive an input sound through the second dummy hole.

* * * * *